US010108590B2

(12) United States Patent
Auriemma et al.

(10) Patent No.: US 10,108,590 B2
(45) Date of Patent: Oct. 23, 2018

(54) COMPARING MARKUP LANGUAGE FILES

(71) Applicant: International Business Machines Corporation, Armonk, NY (US)

(72) Inventors: Stephen T. Auriemma, Chelmsford, MA (US); David Oldfield, Somerville, MA (US); Christopher Z. Su, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1505 days.

(21) Appl. No.: 13/886,907

(22) Filed: May 3, 2013

(65) Prior Publication Data

US 2014/0330775 A1    Nov. 6, 2014

(51) Int. Cl.
*G06F 17/22* (2006.01)
*G06F 17/21* (2006.01)

(52) U.S. Cl.
CPC ........ *G06F 17/2247* (2013.01); *G06F 17/218* (2013.01); *G06F 17/2211* (2013.01)

(58) Field of Classification Search
None
See application file for complete search history.

(56) References Cited

U.S. PATENT DOCUMENTS

| | | | | |
|---|---|---|---|---|
| 5,956,726 A * | 9/1999 | Aoyama | ............. | G06F 17/2211 707/755 |
| 7,660,819 B1 * | 2/2010 | Frieder | ............. | G06F 17/30687 707/999.107 |
| 7,661,062 B1 | 2/2010 | Connaughton | | |
| 2003/0028561 A1 * | 2/2003 | Gounares | ............... | G06F 17/227 715/234 |
| 2005/0010764 A1 * | 1/2005 | Collet | ..................... | G06F 21/10 713/165 |
| 2009/0307256 A1 * | 12/2009 | Tiyyagura | ......... | G06F 17/30911 |
| 2012/0089397 A1 * | 4/2012 | Arai | ..................... | G10L 15/063 704/251 |

(Continued)

FOREIGN PATENT DOCUMENTS

CN          101957816 A          1/2011

OTHER PUBLICATIONS

"HTML Match," [online] Salty Brine Software © 2009 [retrieved Mar. 21, 2013] retrieved from the Internet: <http://htmlmatch.com/>, 2 pgs.

(Continued)

*Primary Examiner* — Tjau-Shya Meng
(74) *Attorney, Agent, or Firm* — Cuenot, Forsythe & Kim, LLC

(57) ABSTRACT

Processing markup language files can include pre-processing an original file and a new file, wherein the original file and the new file are markup language files. Pre-processing includes removing tags from the original file and the new file resulting in a pure text version of the original file and a pure text version of the new file. Using a processor, the pure text version of the original file is compared with the pure text version of the new file to determine differences. The differences are specified in a comparison result. The comparison result is post-processed by applying formatting to the differences and tags from the new file.

16 Claims, 2 Drawing Sheets

(56) References Cited

U.S. PATENT DOCUMENTS

| | | | | |
|---|---|---|---|---|
| 2013/0124755 A1* | 5/2013 | Haywood | ......... | G06F 17/30887 709/238 |
| 2014/0053053 A1* | 2/2014 | Hogue | ................ | G06F 17/2247 715/234 |
| 2014/0173426 A1* | 6/2014 | Huang | ................ | G06F 17/2705 715/256 |
| 2014/0330834 A1 | 11/2014 | Auriemma et al. | | |

OTHER PUBLICATIONS

"Beyond Compare" [online] Scooter Software, Inc. © 2013 [retrieved Mar. 21, 2013] retrieved from the Internet: <http://www.scootersoftware.com/moreinfo.php?zz=moreinfo_compare>, 1 pg.

* cited by examiner

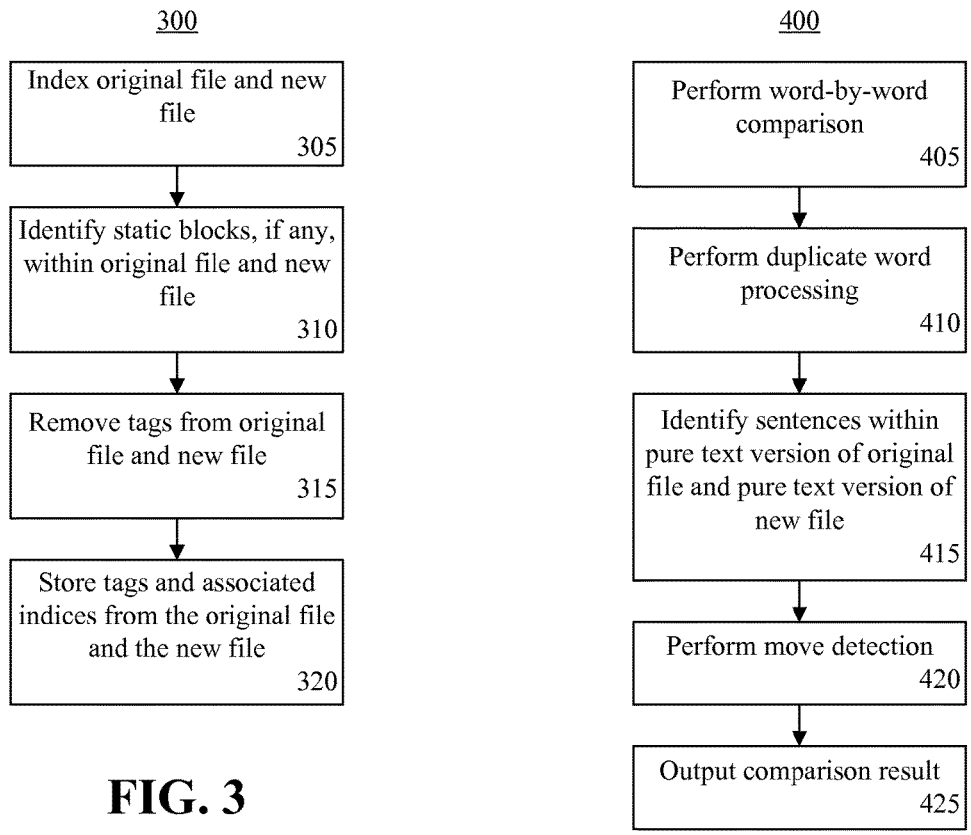
FIG. 3
FIG. 4
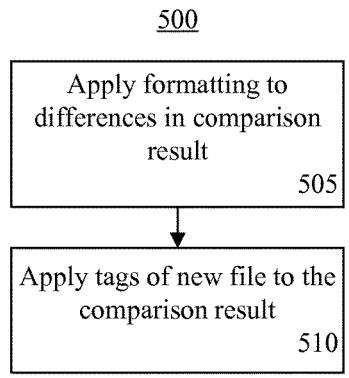
FIG. 5

COMPARING MARKUP LANGUAGE FILES

BACKGROUND

Many organizations, whether public or private, generate a significant number of documents, e.g., files, such as guidelines, policies, or the like. These documents undergo revisions, various stages of review, approval processes, and, in some cases are published. Often, the documents are published on the Internet or an intranet in the form of Hypertext Markup Language (HTML) files.

In view of the various lifecycle stages of a document, it often becomes necessary to accurately represent changes to the document over time. Changes must be tracked efficiently and accurately from one version of the document to another. There are a variety of tools available that are capable of comparing two versions of a file and detecting changes. These tools, however, tend to operate on either plain text or attempt to process HTML files while applying a full understanding of the HTML document object model.

BRIEF SUMMARY

In one aspect, a method includes pre-processing an original file and a new file, wherein the original file and the new file are markup language files, and wherein the pre-processing includes removing tags from the original file and the new file resulting in a pure text version of the original file and a pure text version of the new file. The method further includes comparing, using a processor, the pure text version of the original file with the pure text version of the new file to determine differences, wherein the differences are specified in a comparison result. The comparison result is post-processed by applying formatting to the differences and tags from the new file.

In another aspect, a system includes a processor programmed to initiate executable operations. The executable operations include pre-processing an original file and a new file, wherein the original file and the new file are markup language files, and wherein the pre-processing includes removing tags from the original file and the new file resulting in a pure text version of the original file and a pure text version of the new file. The executable operations also include comparing the pure text version of the original file with the pure text version of the new file to determine differences, wherein the differences are specified in a comparison result. The executable operations further include post-processing the comparison result by applying formatting to the differences and tags from the new file.

In another aspect, a computer program product for processing markup language files includes a computer readable storage medium having program code stored thereon. The program code is executable by a processor to perform a method. The method includes pre-processing, using the processor, an original file and a new file, wherein the original file and the new file are markup language files, and wherein the pre-processing includes removing tags from the original file and the new file resulting in a pure text version of the original file and a pure text version of the new file. The method also includes comparing, using the processor, the pure text version of the original file with the pure text version of the new file to determine differences, wherein the differences are specified in a comparison result. The method further includes post-processing, using the processor, the comparison result by applying formatting to the differences and tags from the new file.

BRIEF DESCRIPTION OF THE SEVERAL VIEWS OF THE DRAWINGS

FIG. 3 is a flow chart illustrating an exemplary method of pre-processing markup language files.

FIG. 4 is a flowchart illustrating an exemplary method of processing text derived from markup language files.

FIG. 5 is a flowchart illustrating an exemplary method of post-processing a file.

DETAILED DESCRIPTION

Figure 1:
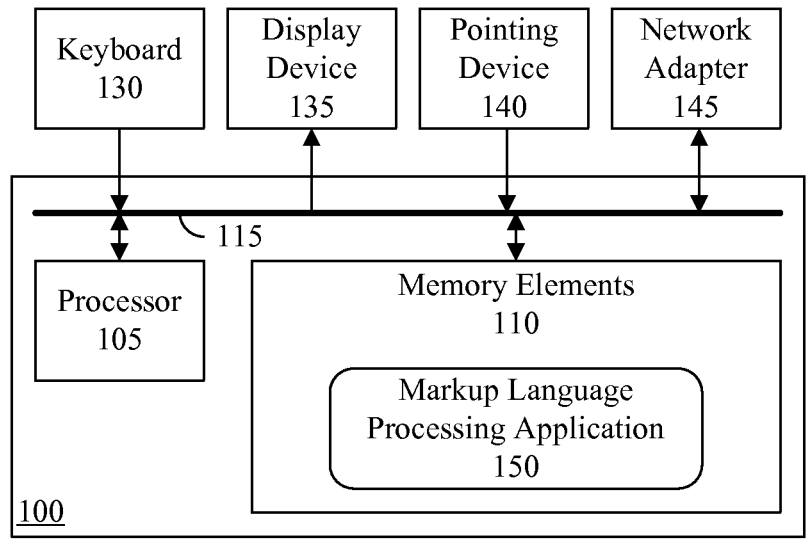
FIG. 1 is a block diagram illustrating an exemplary system for processing markup language files.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

This specification relates to processing markup language files. In accordance with the inventive arrangements disclosed herein, to markup language files can be compared with one another. Each of the two markup language files to be compared is pre-processed in order to remove tags found within each respective file. The pre-processing generates pure text from each markup language file. Accordingly, the pure text of each markup language file can be compared to recognize differences between the two. The differences can be specified in a comparison result. Formatting can be applied to the comparison result as are tags resulting in a difference file that can be rendered, e.g., displayed, with changes illustrated inline. By removing tags from each markup language file to be compared before performing the comparison, the comparison processing is relieved from having to understand the particular document object model of the markup language that is used. As such, the comparison process need not be updated each time the document object model of the markup language of the files to be compared changes.

FIG. 1 is a block diagram illustrating an exemplary system 100 for processing markup language files. System 100 can include at least one processor 105, e.g., a central processing unit, coupled to memory elements 110 through a system bus 115 or other suitable circuitry. As such, system 100 can store program code within memory elements 110. Processor 105 executes the program code accessed from memory elements 110 via system bus 115 or the other suitable circuitry.

In one aspect, system 100 is implemented as a computer or other programmable data processing apparatus that is suitable for storing and/or executing program code. It should be appreciated, however, that system 100 can be implemented in the form of any system including a processor and memory that is capable of performing and/or initiating the functions and/or operations described within this specification. Further, system 100 can be implemented in any of a variety of different form factors including, but not limited to, a tablet, a communication device, a laptop computing device, a desktop computing device, a server, or the like.

Memory elements 110 include one or more physical memory devices such as, for example, local memory and one or more bulk storage devices (not shown). Local memory refers to RAM or other non-persistent memory device(s) generally used during actual execution of the program code. A bulk storage device can be implemented as a hard disk drive (HDD), solid state drive (SSD), or other persistent data storage device. System 100 also can include one or more cache memories (not shown) that provide temporary storage of at least some program code in order to reduce the number of times program code must be retrieved from the bulk storage device during execution.

Input/output (I/O) devices such as a keyboard 130, a display device 135, and a pointing device 140 optionally can be coupled to system 100. The I/O devices can be coupled to system 100 either directly or through intervening I/O controllers. One or more network adapters 145 also can be coupled to system 100 to enable system 100 to become coupled to other systems, computer systems, remote printers, and/or remote storage devices through intervening private or public networks. Modems, cable modems, wireless transceivers, and Ethernet cards are examples of different types of network adapters 145 that can be used with system 100.

As pictured in FIG. 1, memory elements 110 can store a Markup Language Processing Application 150. Markup Language Processing Application 150, being implemented in the form of executable program code, is executed by system 100 and, as such, is considered an integrated part of system 100. Markup Language Processing Application 150, when executed by processor 105 of system 100, causes system 100 to perform the various operations disclosed within this specification relating to processing markup language files. Markup Language Processing Application 150, data structures generated by Markup Language Processing Application 150, the markup language files evaluated, and any intermediate and/or final results generated by system 100 are functional data structures that impart functionality when employed as part of system 100.

Figure 2:
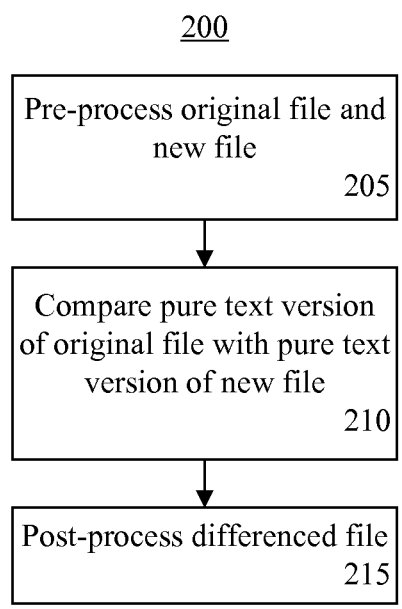
FIG. 2 is a flow chart illustrating an exemplary method of processing markup language files.

FIG. 2 is a flow chart illustrating an exemplary method 200 of processing markup language files. Method 200 generally illustrates operations performed by system 100 of FIG. 1. Method 200 begins in a state where an original file and a new file are to be compared. Each of the original file and the new file is a markup language file. In one aspect, each of the original file and the new file is a Hypertext Markup Language (HTML) file. For purposes of illustration, it can be assumed that the new file is an updated, revised, or otherwise changed version of the original file. Accordingly, the new file is a changed version of the original file.

Method 200 can begin in block 205 where the system pre-processes the original file and the new file. In one aspect, pre-processing removes tags from each of the original file and the new file. Removal of the tags from each respective document results in pure text of the original file and pure text of the new file. In one aspect, the original file and the new file each is transformed through removal of tags leaving a pure text version of the original file and a pure text version of the new file. In another aspect, the system generates a pure text file from the original file and a pure text file from the new file, e.g., files that include only text and no tags. Reference to a "pure text version of a file" or "pure text of a file" refers to such files whether newly created or created through removal, e.g., deletion, of tags from the file. As such, "removing tags" from a file is intended to refer to either of the aforementioned examples and any equivalents thereof. In any case, neither the pure text version of the original file nor the pure text version of the new file includes tags once pre-processing is complete.

As used within this specification, a "tag" refers to a unit of information used as a label or marker. With respect to HTML, a tag typically provides information to the processing system that is to render the HTML and indicates how particular content, e.g., text, is to be displayed. Tags, however, may serve other functions. In general, a tag is set off or otherwise distinguished from other portions of a markup language document such as text using "<" and ">". The terms "word" and "text" refer to any symbol, letter, number, character, or the like of a markup language file or portion of markup language that, when rendered, is displayed upon a display screen. For example, a "word" or "text," with respect to an HTML file is any symbol, letter, number, character, etc., specified within the HTML file that is displayed upon a display screen when a browser executed by a data processing system renders the HTML file. Accordingly, a "pure text" file or version thereof includes only words or text, but no tags. The pure text includes only the text that would be displayed upon a display screen were the markup language file to be rendered.

In block 210, the system compares the pure text version of the original file with the pure text version of the new file to determine differences. The differences can be specified as a comparison result. In one example, the comparison result is a difference file. In block 215, the system performs post-processing on the comparison result. More particularly, the system applies tags to the comparison result. Having applied tags, the comparison result is a markup language file. For example, the comparison result after application of tags is an HTML document that specifies changes between the original file and the new file using "inline" formatting. "Inline" means that differences between the original file and the new file are not illustrated as a side-by-side comparison. Rather, changes are illustrated using appropriate formatting. Selected formatting is applied to additions, a different formatting is applied to deletions, and a different formatting is applied to moved content or text.

FIG. 3 is a flow chart illustrating an exemplary method 300 of pre-processing markup language documents. Method 300 can be performed by system 100 of FIG. 1. As discussed, the system is provided with, or receives, an original file and a new file. The original file and the new file are markup language files. As noted, in one example, each of the original file and the new file is an HTML file. The new file is a changed version of the original file.

In block 305, the system indexes the original file and the new file. The indexing that is performed can include one or more indexing operations. In illustration, consider the portion of HTML below.

---

<div class="heading1"><i>The red brown fox jumped over the rolling log</i><br/></div><div class="heading1"><i><b>Hello, how are you?</i></b><br/></div>

---

In one example, for each of the original file and the new file, the system generates an index in which each tag and each word is given, or assigned, an index. For each of the original file and the new file, the system generates a complete index that includes both words and tags of the HTML. A partial example of a complete index for the above HTML is shown below.

---

| 0  | "<div class="heading1">" |
| 1  | "<i>" |
| 2  | "The" |
| 3  | " " |
| 4  | "red" |
| 5  | " " |
| 6  | "brown" |
| 7  | " " |
| 8  | "fox" |
| 9  | " " |
| 10 | "jumped" |
| 11 | " " |
| 12 | "over" |
| 13 | " " |
| 14 | "this" |
| 15 | " " |
| 16 | "rolling" |
| 17 | " " |
| 18 | "log" |
| 19 | "</i>" |
| 20 | "<br/>" |
| 21 | "</div>" |
| 22 | "<div class="heading1">" |
| 23 | "<i>" |
| ... | |

---

For purposes of illustration, the entirety of the complete index is not shown. It should be appreciated, however, that each tag is assigned and index and each word is assigned an index. The index is assigned in accordance with the order of each element, e.g., a tag or a word, within the file being indexed. Each punctuation mark, i.e., a comma, a question mark, etc., and each space is considered a word and is assigned its own index. Accordingly, the index of a tag specifies a location of that tag within the file that is indexed. Further, the location of the tag is specified relative to surrounding text of the file. As noted, a complete index is generated for each of the original file and the new file.

As part of the indexing that is performed, the system further can generate a word-only index for each of the original file and the new file. As its name suggests, the word-only index is an index of only words and includes no tags. Referring again to the portion of HTML, a partial example of a word-only index is listed below.

| 0  | "The"     |
|----|-----------|
| 1  | " "       |
| 2  | "red"     |
| 3  | " "       |
| 4  | "brown"   |
| 5  | " "       |
| 6  | "fox"     |
| 7  | " "       |
| 8  | "jumped"  |
| 9  | " "       |
| 10 | "over"    |
| 11 | " "       |
| 12 | "this"    |
| 13 | " "       |
| 14 | "rolling" |
| 15 | " "       |
| 16 | "log"     |
| ...|           |

As shown, the word-only index renumbers the words without the tags. Tags can be readily distinguished from text by recognizing characters such as "<" and/or ">". As noted, a word-only index is generated for each of the original file and the new file.

Further, as part of the indexing operations, the system can generate a cross-reference index for each of the original file and the new file. The cross-reference index cross-references the complete index with the word-only index for the subject file. A partial example of a cross-reference index is provided below.

| 0  | 2  |
|----|----|
| 1  | 3  |
| 2  | 4  |
| 3  | 5  |
| 4  | 6  |
| 5  | 7  |
| 6  | 8  |
| 7  | 9  |
| 8  | 10 |
| 9  | 11 |
| 10 | 12 |
| 11 | 13 |
| 12 | 14 |
| 13 | 15 |
| 14 | 16 |
| 15 | 17 |
| 16 | 18 |
| ...|    |

The cross-reference index includes a first column (on the left) specifying an index value for the word-only index. The second column (on the right) specifies the index value for the word in the same row from the complete index. Thus, the first row including "0 2" indicates that word "The" having an index 0 in the word-only index corresponds to, or is the same as, the word "The" having an index 2 in the complete index.

In block 310, the system identifies any static blocks within the original file and the new file. A static block refers to a portion of a file that is not permitted to change from one version of the file to another, e.g., from the original file to the new file. As such, the static blocks do not require any comparison. Typically, static blocks are indicated by some marker within the original file and the new file. Such portions of each respective file can be identified and excluded for purposes of comparison.

In block 315, the system removes the tags from the original file and removes the tags from the new file. As part of tag removal, the system removes "carriage returns" or the <br> tag. As noted, tags can be removed from the original file and from the new file with each file being saved as the pure text version of the relevant file. Alternatively, the system can create a new file that includes only the text of each respective file. In any case, the result of block 315 is a pure text version of the original file and a pure text version of the new file.

In block 320, the system stores each tag removed from the original file, along with the index for the tag as determined from the complete index for the original file, within a data structure in memory. The system stores each tag removed from the new file, along with the index for the tag as determined from the complete index for the new file, within another data structure in memory. In one aspect, the data structure used can be a hash map. In this regard, each of the various indices described with regard to block 305, for example, can be stored as a hash map or other suitable data structure in memory. It should be appreciated, however, that the embodiments disclosed within this specification are not intended to be limited by the particular data structure used to store tags and/or indices as any of a variety of different data structures can be utilized.

FIG. 4 is a flowchart illustrating an exemplary method 400 of processing pure text derived from markup language documents. Method 400 can be performed by system 100 of FIG. 1. Method 400 illustrates an exemplary technique for comparing and determining differences between the pure text version of the original file and the pure text version of the new file. The operations shown in FIG. 4 illustrate various aspects of the text processing, e.g., comparison, that is performed. In one aspect, a technique as disclosed by Heckel, "A technique for isolating differences between files," Communications of the ACM, vol. 21, issue 4 (1978), can be used. It should be appreciated, however, that any of a variety of known text processing techniques that are capable of performing a diff operation or determining differences between two corpuses of text can be used. Other exemplary techniques include those addressing the longest common subsequence (LCS) problem. Still other exemplary techniques include those disclosed in Hirschberg, "Algorithms for the Longest Common Subsequence Problem," Journal of the ACM, vol. 24, issue 4 (October 1997), or the like. In this regard, method 400 illustrates one or more exemplary operations that can be included within such processes.

In block 405, the system performs a word-by-word comparison of the pure text version of the original file and the pure text version of the new file. By comparing the pure text of each file, e.g., further using the word only indices, the system can determine differences between the pure text version of the original file and the pure text version of the new file. A "difference" between two portions of text refers to an addition of text, a deletion of text, or a move of text from one location to another, different location. Typically, a difference is described from the perspective of moving from the original file to the new file. For example, an addition of text refers to text added to the new file not previously in the original file.

It should be appreciated that words that are part of any identified static blocks are excluded from the comparisons that are performed. The system effectively ignores such portions of text until such time that the tags are applied to the resulting comparison result. Because a static portion of a file is not to be changed, the static portion can be brought directly into the comparison result that is generated, at the appropriate location, in method 400.

In block 410, the system performs duplicate word processing. In one aspect, duplicate word processing is a technique that is applied to aid in the comparison process generally described with reference to block 405. The system can exclude static portions from duplicate word processing. More particularly, in block 410, the system identifies each instance of a word that exists at least two times within the pure text version of the original file and each instance of the (same) word within the pure text version of the new file. The system determines pairs of corresponding instances of the word, wherein each pair includes one instance of the word from the pure text version of the original file and one instance of the word from the pure text version of the new file. The pairs are further determined according to the location, or index, of each word such that two instances of a word in a pair will have similar or same locations as determined from the respective word-only indices of each word instance.

The system determines whether an instance of the word from the pure text version of the original file exists without a corresponding instance of the word from the pure text version of the new file to form a pair. The system further can determine whether an instance of the word from the pure text version of the new file exists without a corresponding instance of the word from the pure text version of the original file to form a pair.

In illustration, consider the case in which the pure text of the original file includes 10 instances of the word "the," and the pure text of the new file includes nine instances of the word "the." Using the various indices created for the original file and the new file, the system creates pairs of corresponding instances of the word "the," where each pair includes one instance of the word "the" from the pure text version of the original file and one instance of the word "the" from the pure text version of the new file. By creating pairs in this manner, the system determines that there is one instance of the word "the" from the pure text version of the original file that does not have a corresponding instance of the word "the" from the pure text version of the new file to create a pair. The instance of the word in the pure text version of the original file is not paired with a corresponding instance of the word in the pure text version of the new file. In this example, the system determines that the instance of the word "the" that is not paired with another instance, has been deleted from the new file.

The duplicate word processing described with reference to block for 410 is not used in block 405 for purposes of general comparison. For example, the processing described with reference to block 410 is not performed for each word. Rather, duplicate word processing is used as an extra processing step to facilitate accuracy in the overall comparison process and applied to duplicate words, i.e., words appearing in a given body of text more than one time.

In block 415, the system identifies sentences within the pure text version of the original file and also within the pure text version of the new file. In one aspect, sentences can be determined by identifying punctuation such as periods, exclamation points, question marks, etc. within the pure text. In another aspect, the system can apply one or more other techniques such as natural language processing, or the like to determine or differentiate individual sentences within the pure text version of the original file and the pure text version of the new file. Identifying sentences allows for a more accurate representation of detected differences to a user and aids in the determination of whether text is represented as being moved in a particular direction. For example, in some instances, such as a change in order of list items, the difference can be described as moving one list item up in the list or moving another list item down in the list. Sentence determination provides context in making such decisions to present a more intuitive representation of the detected differences between the pure text version of the original file and the pure text version of the new file that are located.

In block 420, the system can perform move detection. Thus, rather than illustrating a move as a combination of a deletion and unrelated insertion of the same text detected as being deleted, the portion of text is represented as having been moved from one location in the pure text version of the original file to a different location in the pure text version of the new file.

In block 425, the system outputs a comparison result. In one aspect, the comparison result is a difference file. The comparison result, for example, includes the pure text version of the new file and any text that was determined to have been deleted from the pure text of the original file. Text not found within the pure text version of the original file that is found within the pure text version of the new file is annotated as an addition, text from the pure text version of the original file not found within the pure text version of the new file is annotated as a deletion, text determined to have been moved from one location within the pure text version of the original file to a different location in the pure text version of the new file is annotated as having been moved, etc.

In one aspect, the comparison result can be indexed so as to specify an ordering of the words. As such, each word in the difference file can be cross-referenced with an index value for the word with respect to at least one of the original file or the new file. For example, an added word can be cross-referenced with the location of the word in the complete index and the word-only reference for the new file and/or for the original file. A deleted word can be cross-referenced with the location of the word in the complete index and the word-only index for the original file and/or the new file. Moved words can be cross-referenced against indices for both the original file and the new file.

FIG. 5 is a flowchart illustrating an exemplary method 500 of post-processing a file. More particularly, method 500 illustrates a technique used to post-process the comparison result determined in FIG. 4. Method 500 can be performed by system 100 of FIG. 1.

In block 505, the system applies formatting to detected changes in the comparison result. The system can be configured to apply one type of formatting, e.g., text formatting such as bold, italics, strike-through, underling, color, etc., to text additions, another different formatting to text deletions, and another different formatting to text moves. The formatting can be specified using markup language, e.g., HTML tags, that the system applies to the differences noted, or annotated, in the file. In one example, the annotations that are used in the comparison result can be the actual HTML tags used to format the differences detected as described in block 505. In that case, block 505 can be skipped and method 500 can proceed to block 510. In another example, however, additional tags can be added to specify appropriate formatting to indicate the difference type.

In block 510, the system applies tags, or further tags, to the difference file. More particularly, each of the HTML tags determined, or removed, from the new file is applied to, or inserted within, the comparison result. The resulting file, e.g., the difference file, with tags applied, is a markup language file such as an HTML file, with changes represented inline. In applying the tags of the new file to the comparison result, the system is able to determine the proper location of each tag using the various indices previously described. As such, the system inserts each tag into the comparison result at a location that is determined by the various indices for the tag. The indices indicate the location of each tag that is inserted into the comparison result. The system further relies upon the annotations of the difference file.

For example, when an item is added to a list in the new file, the system is able to relocate the ending tag for the list so that the newly added item is included in the list. This results in consistent formatting where the added item is correctly displayed as part of the list rather than as an added line below the list, e.g., without a number or list marker such as a bullet point. Similarly, when an item is deleted from the end of the list, the system can maintain the location of the closing tag to include the deleted item in the list. As such, the difference file correctly displays the list with the last item being displayed as a list item, but with the deleted formatting applied. The system can relocate opening tags, e.g., <x>, or closing tags, e.g., </x>, as required to ensure that the comparison result, when displayed, displays the changes in the correct context, e.g., as part of a list, a table, or the like.

In illustration, an example of an HTML document showing inline changes as determined using conventional techniques is shown below.

List:
Item 1
Item 2

In the example above, item 3 is correctly shown as having been deleted from the new file. The inline changes, however, incorrectly show item 3 as not being part of the list. Using the techniques described within this specification, the resulting comparison result, after application of tags, is rendered as shown below.

List:
Item 1
Item 2

As pictured, item 3 is not only correctly shown as being deleted, but is also correctly illustrated as being part of the list. Such is the case as tags are removed and applied to the comparison result with reference to the location of the tags as specified in the various indices that are generated.

The inventive arrangements disclosed within this specification provide for more accurate differencing of markup language files. Rather than attempting to accurately parse and understand the document object model for the particular markup language that is used, the tags are removed prior to performing any comparison. Accordingly, the system can apply fast and efficient text differencing algorithms. Because the location of each tag removed from the two files being compared is accurately preserved in relation to the text, the tags are reapplied to the comparison result providing a more accurate portrayal of changed elements from one file to another. Further, because tags are removed from the files prior to comparison, the portion of the system responsible for performing the differencing need not be updated when the document object model changes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
a processor programmed to initiate executable operations comprising:
pre-processing an original file and a new file, wherein the original file and the new file are markup language files, and wherein the pre-processing comprises removing tags from the original file and the new file resulting in a pure text version of the original file and a pure text version of the new file;
comparing the pure text version of the original file with the pure text version of the new file to determine differences, wherein the differences are specified in a comparison result; and
post-processing the comparison result by applying formatting to the differences and tags from the new file.

2. The system of claim 1, wherein the original file and the new file each is a Hypertext Markup Language file.

3. The system of claim 1, wherein pre-processing an original file and a new file further comprises:
indexing tags and words of the original file, wherein an index for each tag specifies a location of the tag in relation to words in the original file; and
indexing tags and words of the new file, wherein an index for each tag specifies a location of the tag in relation to words in the new file.

4. The system of claim 3, wherein pre-processing an original file and a new file further comprises:
storing each tag from the original file in association with the index of the tag; and
storing each tag from the new file in association with the index of the tag.

5. The system of claim 4, wherein post-processing the comparison result by applying tags from the new file further comprises:
inserting each tag removed from the new file into the comparison result at a location determined according to the indexing of the tag.

6. The system of claim 1, wherein pre-processing an original file and a new file further comprises:
determining a static portion of the original file and a static portion of the new file;
wherein comparing, using a processor, the pure text version of the original file with the pure text version of the new file to determine differences excludes text of the static portion of the original file and text of the static portion of the new file from the comparing.

7. The system of claim 1, wherein comparing the pure text version of the original file and the pure text version of the new file to determine differences comprises:
identifying each instance of a word that exists at least two times within the pure text version of the original file;
identifying each instance of the word within the pure text version of the new file; and
determining pairs of corresponding instances of the word, wherein each pair comprises one instance of the word from the pure text version of the original file and one instance of the word from the pure text version of the new file; and
determining whether an instance of the word from the pure text version of the original file is not paired with an instance of the word from the pure text version of the new file, or whether an instance of the word from the pure text version of the new file is not paired with an instance of the word from the pure text version of the original file.

8. The system of claim 1, wherein post-processing the comparison result by applying tags from the original file comprises:
determining a plurality of items within the comparison result that are within a list; and
adjusting a location of at least one of an opening tag or a closing tag of the list within the comparison result to include a changed item of the list.

9. A computer program product for processing markup language files, comprising:
a computer readable hardware storage device having program code stored thereon,
the program code executable by a processor to perform:
pre-processing an original file and a new file, wherein the original file and the new file are markup language files, and wherein the pre-processing comprises removing tags from the original file and the new file resulting in a pure text version of the original file and a pure text version of the new file;
comparing the pure text version of the original file with the pure text version of the new file to determine differences, wherein the differences are specified in a comparison result; and
post-processing the comparison result by applying formatting to the differences and tags from the new file.

10. The computer program product of claim 9, wherein the original file and the new file each is a Hypertext Markup Language file.

11. The computer program product of claim 9, wherein pre-processing, using the processor, an original file and a new file further comprises:
indexing tags and words of the original file, wherein an index for each tag specifies a location of the tag in relation to words in the original file; and
indexing tags and words of the new file, wherein an index for each tag specifies a location of the tag in relation to words in the new file.

12. The computer program product of claim 11, wherein pre-processing, using the processor, an original file and a new file further comprises:
storing each tag from the original file in association with the index of the tag; and
storing each tag from the new file in association with the index of the tag.

13. The computer program product of claim 12, wherein post-processing, using the processor, the comparison result by applying tags from the new file further comprises:
inserting each tag removed from the new file into the comparison result at a location determined according to the indexing of the tag.

14. The computer program product of claim 9, wherein pre-processing, using the processor, an original file and a new file further comprises:
determining a static portion of the original file and a static portion of the new file;
wherein comparing, using a processor, the pure text version of the original file with the pure text version of the new file to determine differences excludes text of the static portion of the original file and text of the static portion of the new file from the comparing.

15. The computer program product of claim 9, wherein comparing, using the processor, the pure text version of the original file and the pure text version of the new file to determine differences comprises:
- identifying each instance of a word that exists at least two times within the pure text version of the original file;
- identifying each instance of the word within the pure text version of the new file; and
- determining pairs of corresponding instances of the word, wherein each pair comprises one instance of the word from the pure text version of the original file and one instance of the word from the pure text version of the new file; and
- determining whether an instance of the word from the pure text version of the original file is not paired with an instance of the word from the pure text version of the new file, or whether an instance of the word from the pure text version of the new file is not paired with an instance of the word from the pure text version of the original file.

16. The computer program product of claim 9, wherein post-processing, using the processor, the comparison result by applying tags from the original file comprises:
- determining a plurality of items within the comparison result that are within a list; and
- adjusting a location of at least one of an opening tag or a closing tag of the list within the comparison result to include a changed item of the list.

* * * * *